United States Patent
Niikura et al.

(10) Patent No.: US 6,954,935 B2
(45) Date of Patent: Oct. 11, 2005

(54) DISK DEVICE

(75) Inventors: Eiji Niikura, Tokyo (JP); Takeshi Inatani, Tokyo (JP); Masaaki Takeshima, Tokyo (JP); Kei Shirahata, Tokyo (JP); Kazutoshi Taniguchi, Tokyo (JP); Takashi Kuzuu, Tokyo (JP); Shoji Tatehata, Tokyo (JP); Eiji Sasaki, Tokyo (JP); Tetsurou Nagami, Tokyo (JP); Kiichiro Murotani, Tokyo (JP); Hisashi Morita, Tokyo (JP); Nao Watanabe, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 68 days.

(21) Appl. No.: 10/432,215

(22) PCT Filed: Oct. 24, 2001

(86) PCT No.: PCT/JP01/09347

§ 371 (c)(1),
(2), (4) Date: May 22, 2003

(87) PCT Pub. No.: WO03/036635

PCT Pub. Date: May 1, 2003

(65) Prior Publication Data

US 2004/0017767 A1 Jan. 29, 2004

(51) Int. Cl.$^7$ .............................................. G11B 17/03
(52) U.S. Cl. ..................................................... 720/604
(58) Field of Search .............................. 720/604, 631, 720/627; 369/75.2, 30.93; 360/99.02, 99.12

(56) References Cited

U.S. PATENT DOCUMENTS

| 5,583,717 | A | * | 12/1996 | Nakata et al. ............ 360/99.06 |
| 5,615,197 | A | * | 3/1997 | Choi ........................... 720/627 |
| 5,987,001 | A | * | 11/1999 | Ishioka et al. ............ 369/30.93 |
| 6,301,215 | B1 | * | 10/2001 | Otsuki et al. ................ 720/631 |
| 2002/0036976 | A1 | * | 3/2002 | Michimori et al. .......... 369/192 |
| 2004/0017756 | A1 | * | 1/2004 | Takeshima et al. ......... 369/75.2 |

FOREIGN PATENT DOCUMENTS

| EP | 0 962 925 A2 | 12/1999 |
| JP | 2001-101759 A | 4/2001 |

* cited by examiner

*Primary Examiner*—Tianjie Chen
(74) *Attorney, Agent, or Firm*—Birch, Stewart, Kolasch & Birch, LLP

(57) ABSTRACT

A disk device for reproducing information includes a clamper that is used to clamp exchangeable disks. The disk device has a movement regulating member which is engaged with a sliding hole made on a base. A clamper base is engaged with a cam hole made on the movement regulating member to swing around a swinging axis on the base as a center. A clamper arm is supported on the clamper base to hold the clamper which clamps the disk. A positioning member is arranged on the base to abut with the clamper base when the clamper base swings. An energizing member urges the movement regulating member along a direction substantially perpendicular to the sliding direction of the movement regulating member.

6 Claims, 10 Drawing Sheets

DISK DEVICE

This application is the national phase under 35 U.S.C. § 371 of PCT International Application No. PCT/JP01/09347 which has an International filing date of Oct. 24, 2001, which designated the United States of America.

TECHNICAL FIELD

The present invention relates to a disk device by which object disks to be reproduced or to be recorded are exchanged.

BACKGROUND ART

A disk device in the prior art, for example, disclosed in Japanese Laid Open Patent 2001-101759, includes a holding means 103 which is composed of an upper arm 101 and a lower arm 103 and which swings around a swinging axis 104 to hold an arbitrary disk. At the point because a toggle spring 105 keeps a state pressing a positioning pin 106 onto a pick up elevating table 107, in other words, because the toggle spring 105 which has an inflection point within a swinging area of the holding means 103, gives a resisting force against a swinging direction within a swinging area which does not exceed the inflection point, a turn table 108 and a chucking plate 109 are positioned with high precision.

However, because the disk device in the prior art is composed as described above, when a swing stop position is shifted by precision, looseness and the like of parts in the holding means 103, it causes a problem that the resisting force given by the toggle spring 105 is varied and thereby the resisting force becomes unstable at the swing stop position. And because the holding means 103 is made to swing in each case when a disk is exchanged, the resisting force is applied onto swinging members and the toggle spring 105, thereby they are exposed to loads, it causes also a problem that durability of the swinging members and the toggle spring are deteriorated.

The present invention has been made to solve the above described problems and it is an object of the invention to provide a disk device by which accurate positioning can be achieved without having the deterioration of durability.

DISCLOSURE OF THE INVENTION

The disk device in accordance with the present invention includes an energizing member which energizes a movement regulating member along a direction substantially perpendicular to a sliding direction of the movement regulating member.

By this arrangement an effect can be produced that accurate positioning is achieved without having the deterioration of durability.

The disk device in accordance with the present invention includes a widened portion which is arranged in a sliding hole made on a base.

By this arrangement an effect can be produced that an energizing force is applied to a clamper arm only when it is required.

The disk device in accordance with the present invention includes a convex portion which is arranged on the base to abut with the energizing member.

By this arrangement an effect can be produced that the energizing force is applied to a clamper arm only when it is required.

The disk device in accordance with the present invention includes the energizing member which is fixed on the base.

By this arrangement an effect can be produced that a dead space on the movement regulating member is made smaller.

The disk device in accordance with the present invention includes the energizing member which is made on the movement regulating member.

By this arrangement an effect can be produced that a miniaturization of the base is realized.

The disk device in accordance with the present invention includes the energizing member which is composed by a use of spring.

By this arrangement an effect can be produced that the movement regulating member is simply energized without having a complicated structure.

BEST MODE FOR CARRYING OUT THE INVENTION

For explaining the present invention in more detail, best modes for carrying out the invention will be described hereinafter with reference to the accompanied drawings.
Embodiment 1

Figure 1:
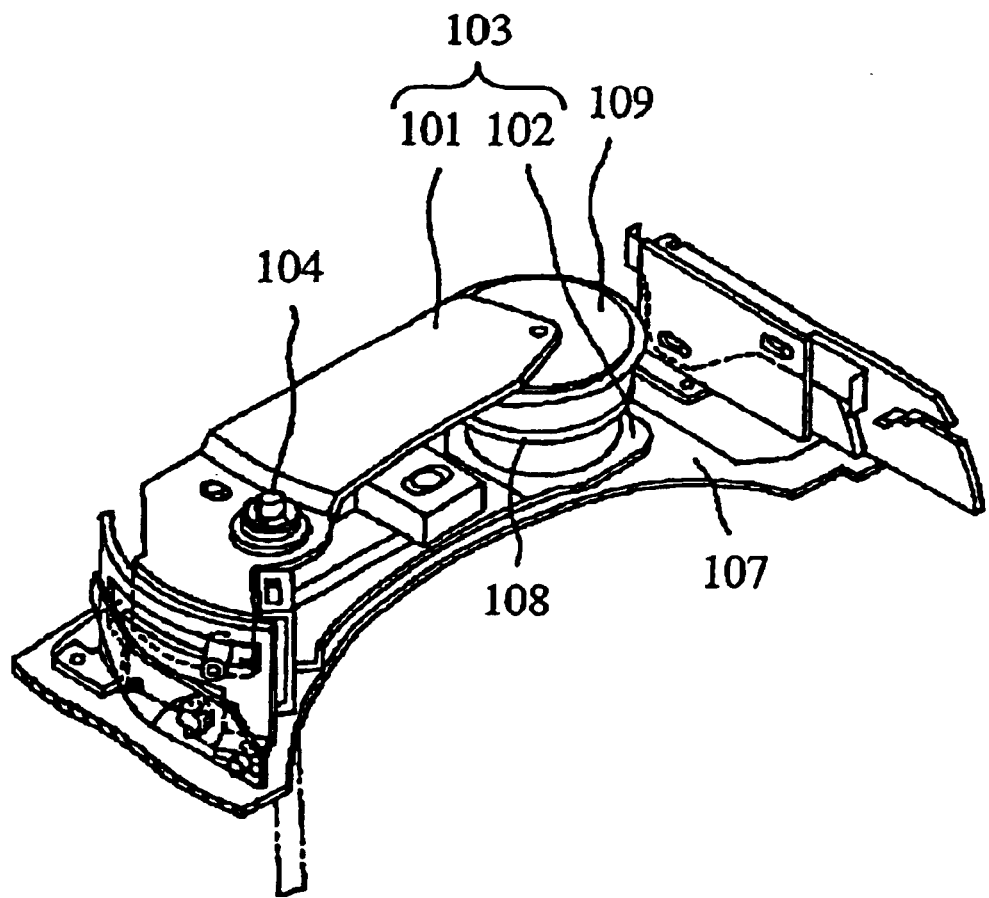
FIG. 1 is a perspective view to show a relevant part of disk device in the prior art.
Figure 2:
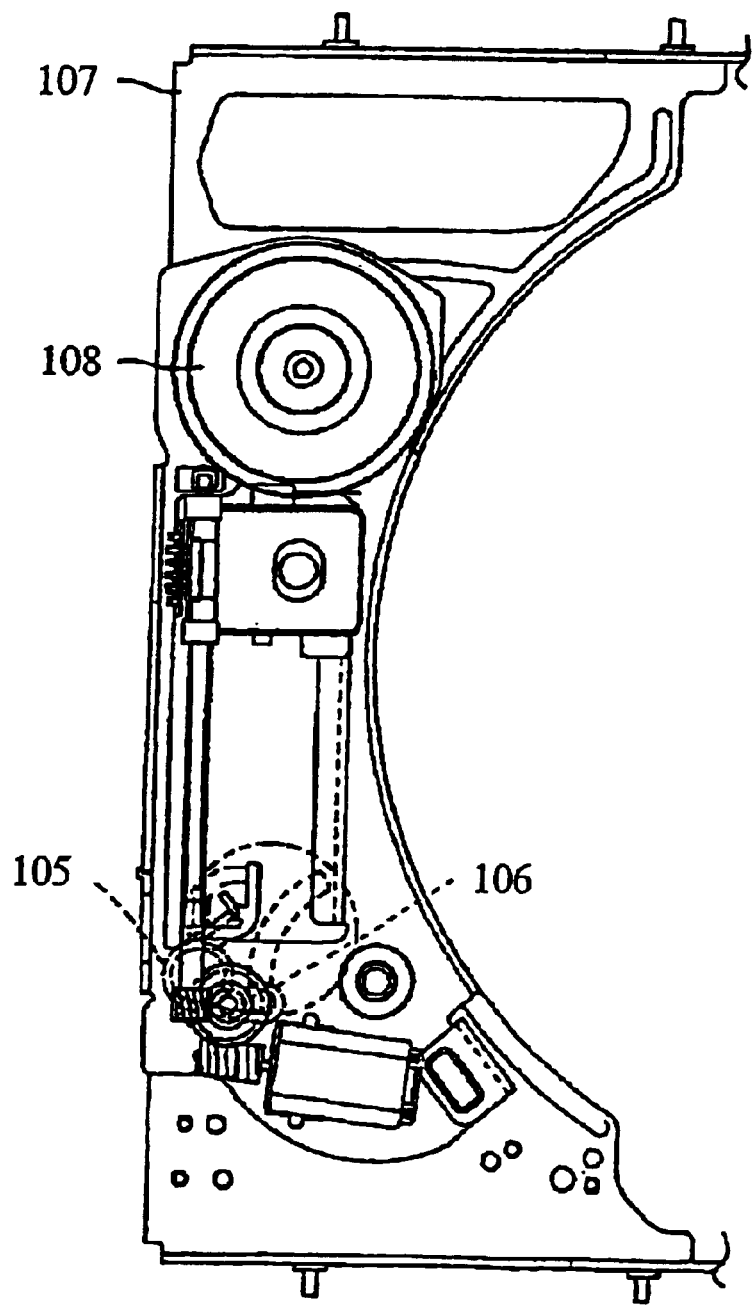
FIG. 2 is a plan view to show a relevant part of disk device in the prior art.
Figure 3:
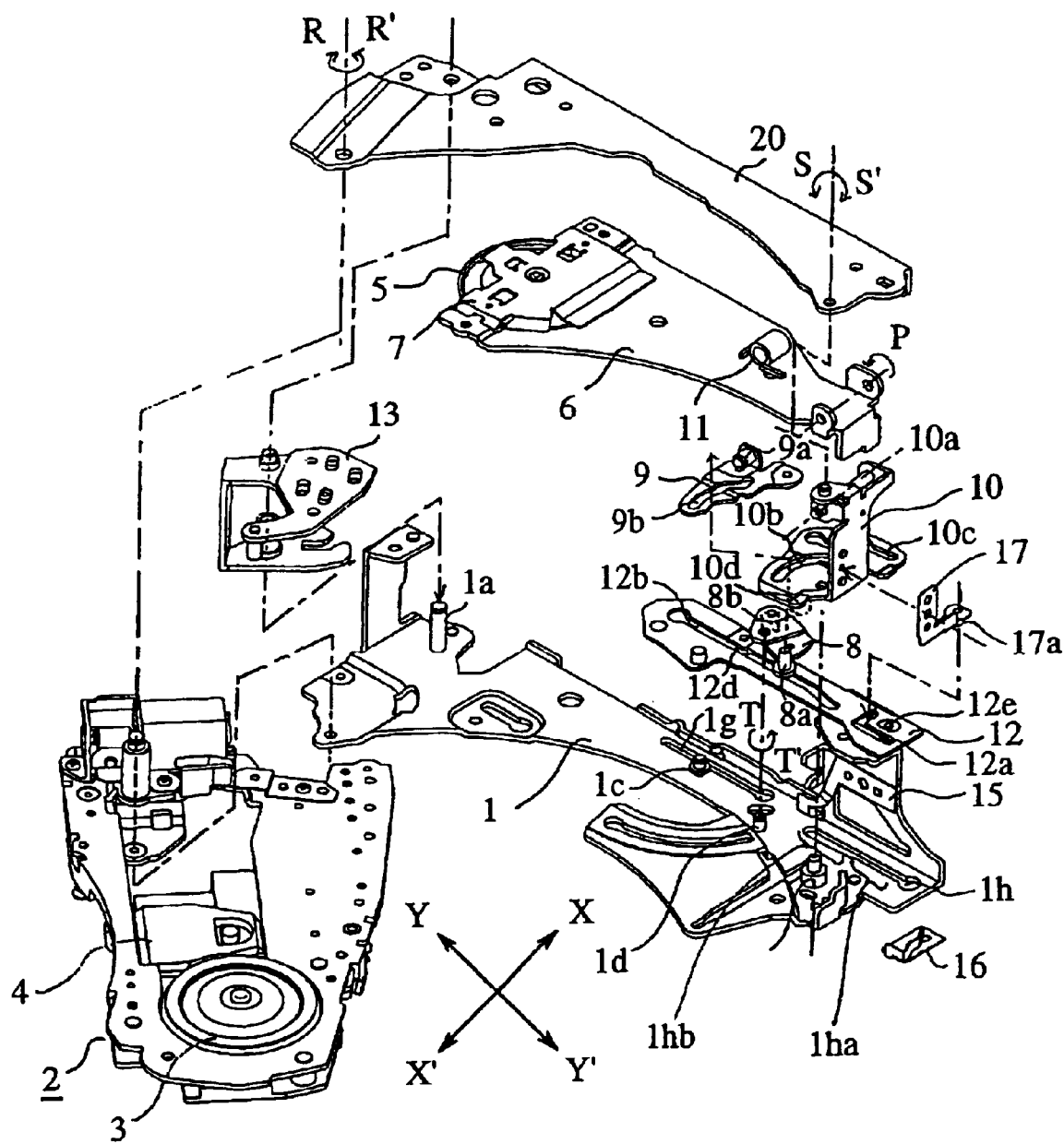
FIG. 3 is an exploded perspective view to show a disk device according to embodiment 1 of the present invention.
Figure 4:
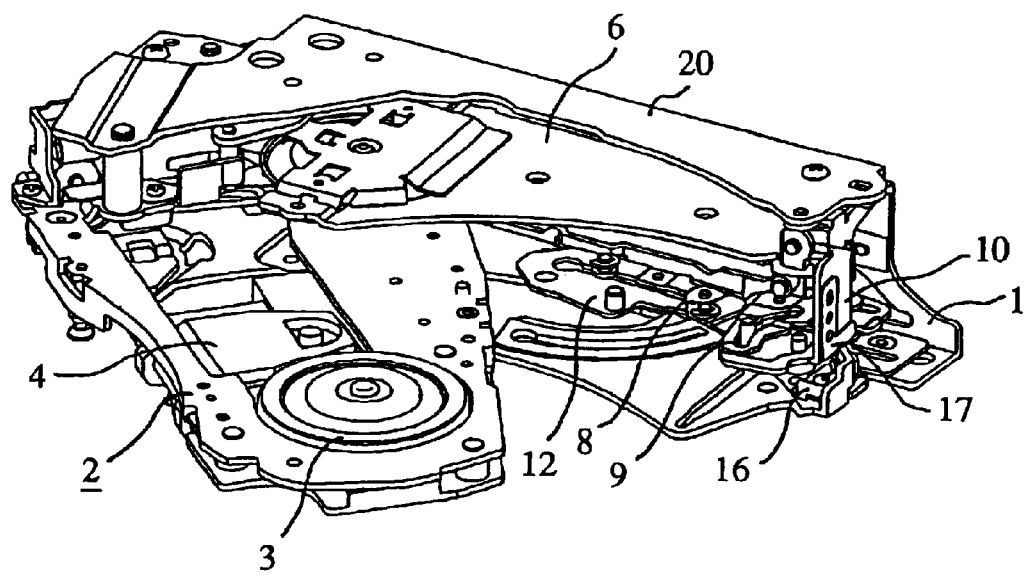
FIG. 4 is a perspective view to show the disk device according to embodiment 1 of the present invention.

FIG. 3 is an exploded perspective view to show a disk device according to embodiment 1 of the present invention and FIG. 4 is a perspective view to show the disk device according to embodiment 1 of the present invention shown. In the drawings a reference numeral 1 designates a base on which supporting axes 1a, 1b, 1c, 1d are arranged to stand and in which sliding holes 1g, 1h are made, 2 designates a reproducing base unit which is supported by the supporting axis 1a of base 1 enably to swing in R–R' direction and which is regulated not to swing over by a swing regulating member 13, 3 designated a turn table set on the reproducing base unit 2, 4 designates an optical pickup which reciprocatedly moves along a predetermined direction in the reproducing base unit 2.

A reference numeral 5 designates a clamper which opposes to the turn table 3 to hold a disk together, 6 designates a clamper arm onto which a clamper holder 7 is fastened by screws, 7 designates the clamper holder by which the clamper 5 is held, 8 designates a clamper driving member having a pin 8a to engage with a cam hole 10b on a clamper base 10 and a cam hole 9b on a clamper plate 9, and which is supported by the supporting axis 1d of base 1 enably to swing in T–T' direction, 9 designates the clamper plate which slides along a cam hole 10c of clamper base 10 and which abuts to contact with a cam shape 6a of the clamper arm 6 by a roller 9a, 10 designates the clamper base supported enably to swing in S–S' direction by the supporting axis 1b of base 1, on which the cam holes 10b, 10c are made at bottom surface portion and on which a sub base 17 having a pin 17a to be stood on is fastened at a vertical portion by screw, while the clamper base supports the clamper arm 6 by an axis 10a.

A reference numeral 11 designates a clamper spring which urges the clamper arm 6 along P direction around the axis 10a, 12 designates a movement regulating member having sliding pins 12d, 12e at back surface which engage with sliding hole 1g, 1h of the base 1, and on which a cam hole 12a engaging with the pin 17a of sub base 17 and a L shaped cam hole 12b engaging with a pin 8b of the clamper driving member 8 and the supporting axis 1c of base 1, are arranged.

A reference numeral 13 designates the swing regulating member to regulate a swing of the reproducing base unit 2, 15 designates an energizing spring (energizing member) which is fastened by screw on a side surface of the base 1, to energize the movement regulating member 12 in a direction (X direction) substantially perpendicular to a sliding direction. A reference numeral 16 designates a positioning member which is fastened by screw onto the base 1, to abut onto an abutting portion 10d set on a bottom surface portion of the clamper base 10. A reference numeral 17 designates the sub base on which the pin 17a are arranged to stand, 20 designates a base top which is fastened onto the base 1 by screws and on which holes are made at the same axial position according to the supporting axis 1a and the supporting axis 1b that are made to be stood on the base 1.

Figure 5:
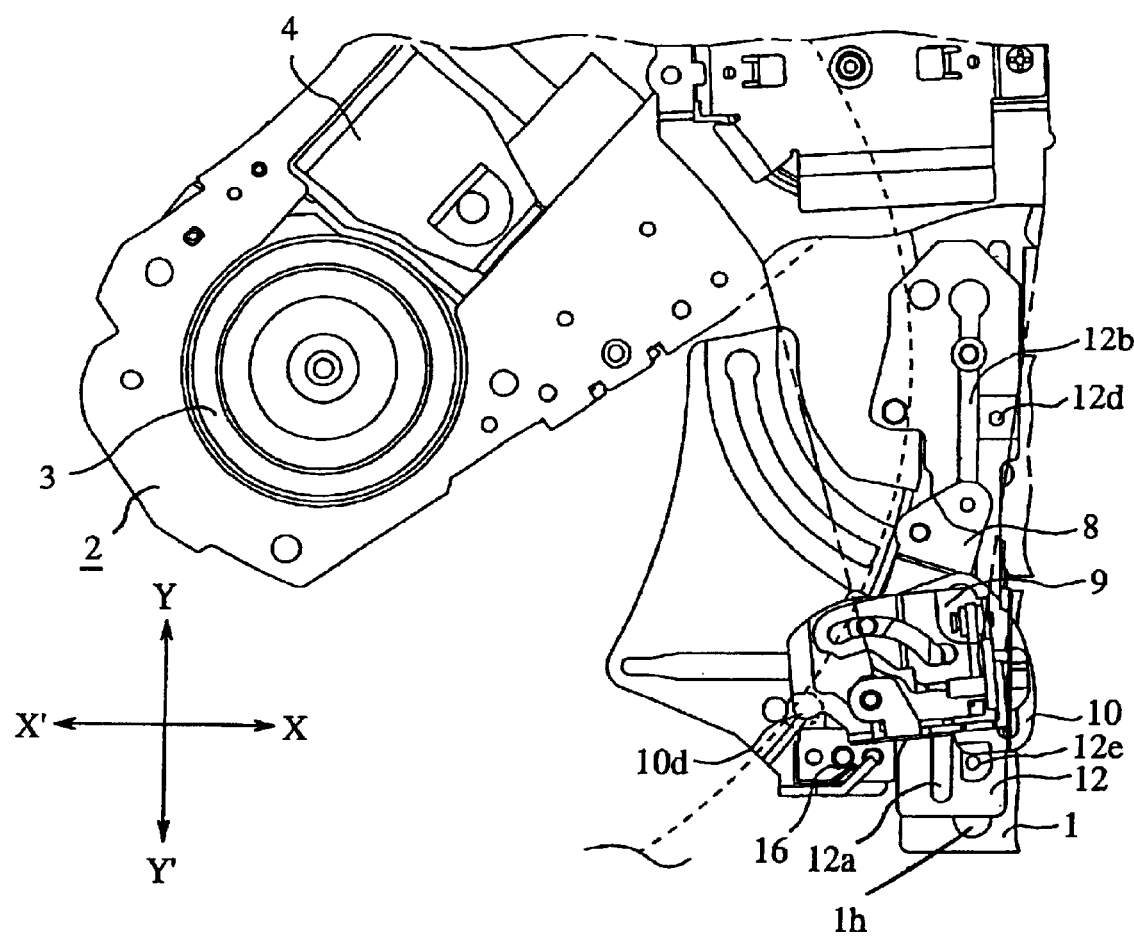
FIG. 5 is a plan view of relevant part to show a waiting position of a clamper arm.
Figure 6:
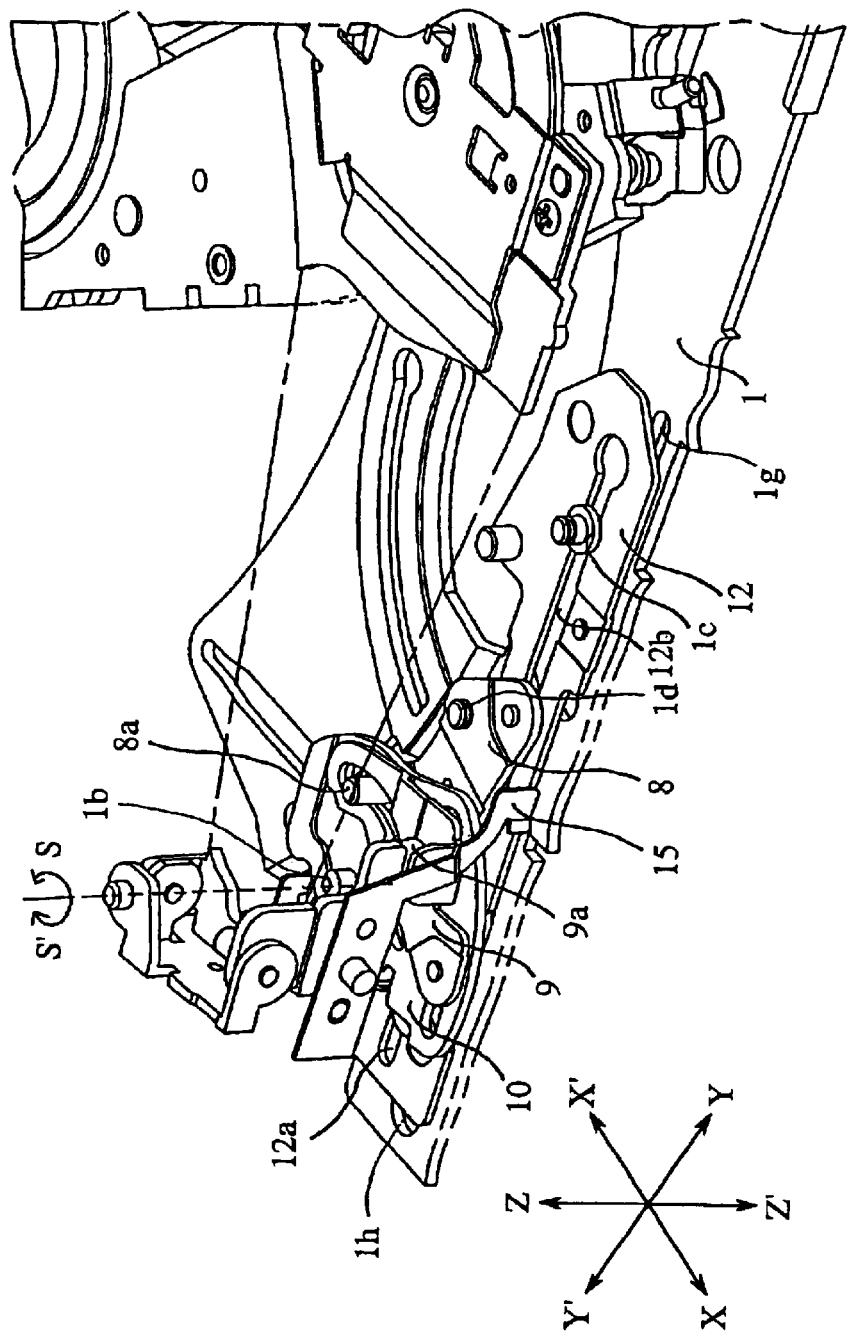
FIG. 6 is a perspective view of relevant part to show the waiting position of the clamper arm.
Figure 7:
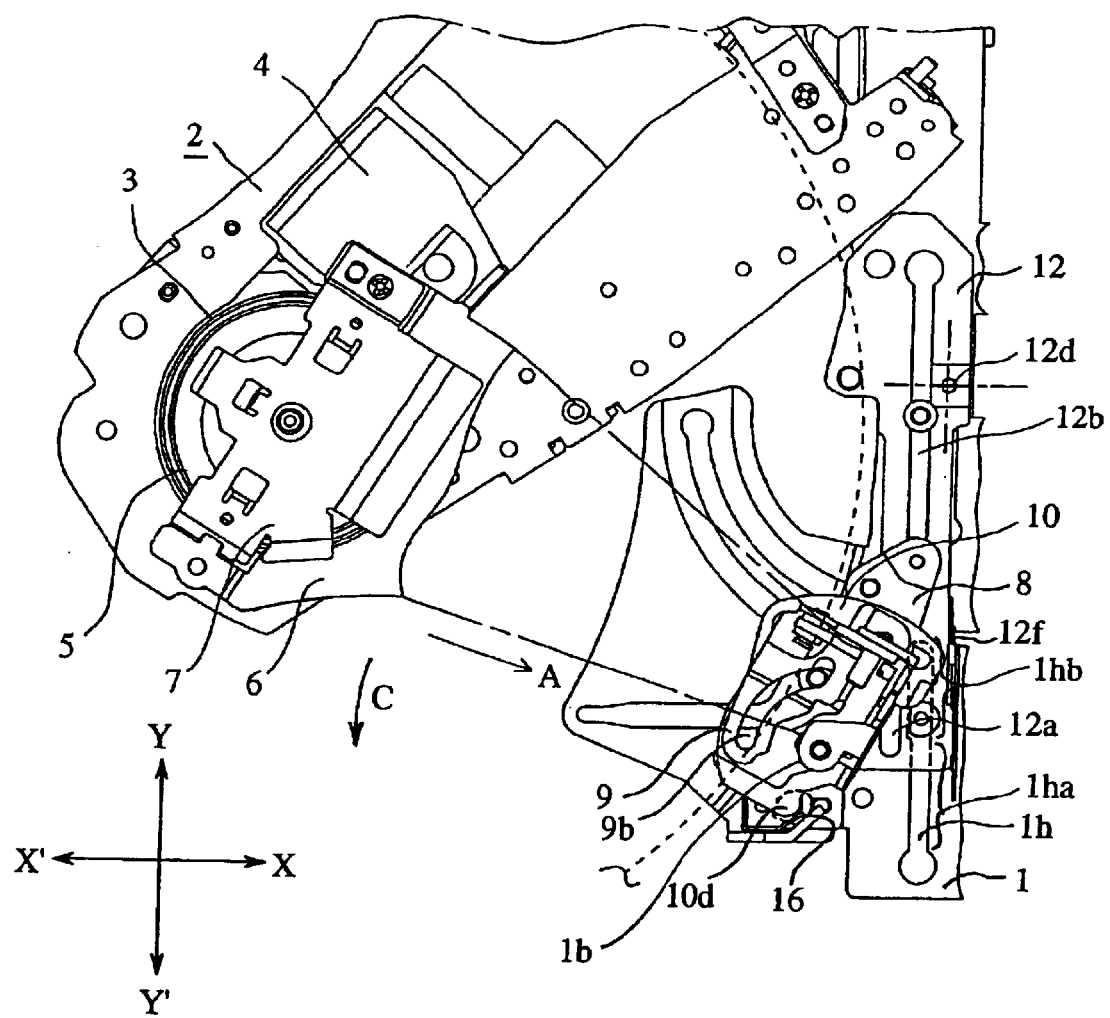
FIG. 7 is a plan view of relevant part to show a position where a turn table and a clamper are positioned on a same axis before they chuck a disk together.
Figure 8:
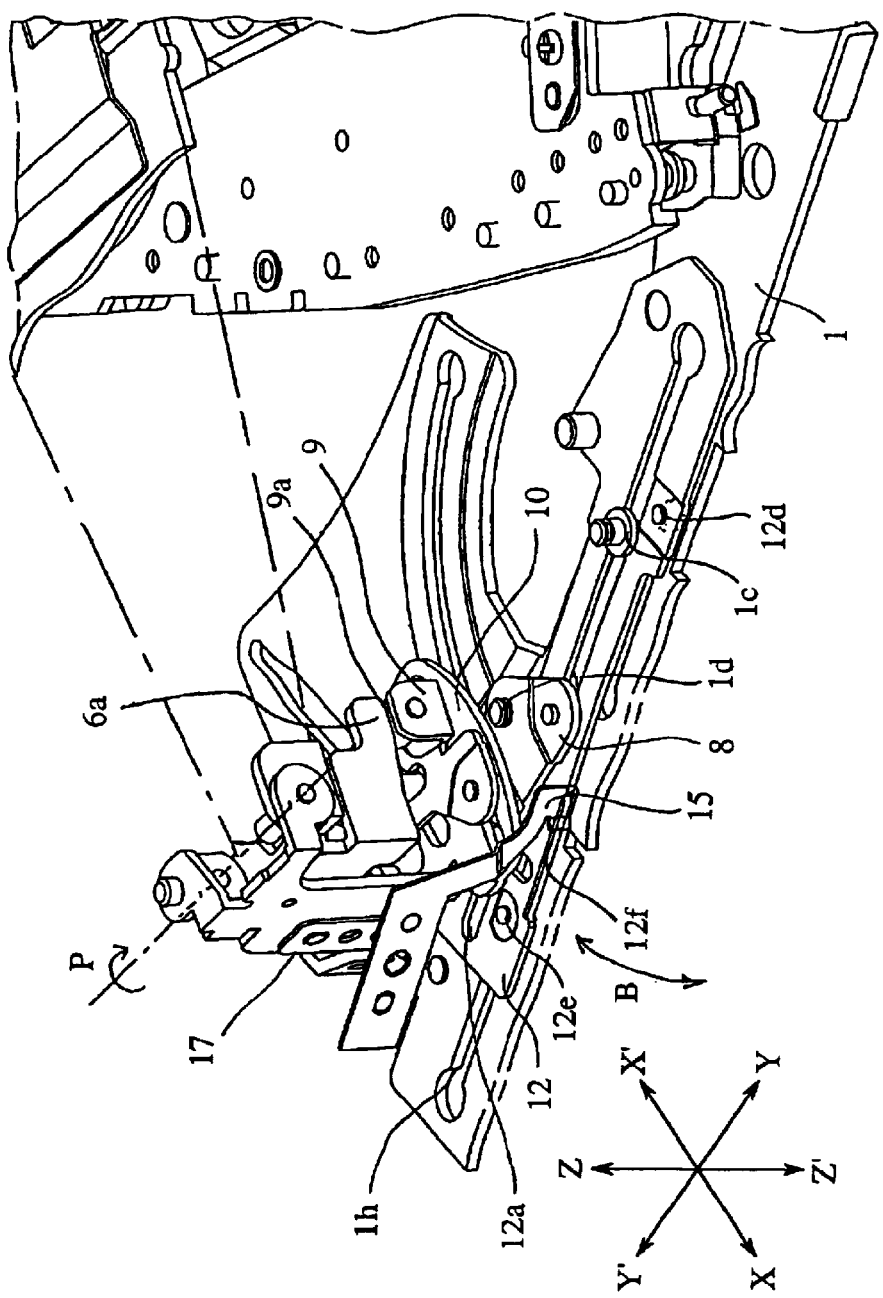
FIG. 8 is a perspective view of relevant part to show the position where a turn table and a clamper are positioned on a same axis before they chuck a disk together.
Figure 9:
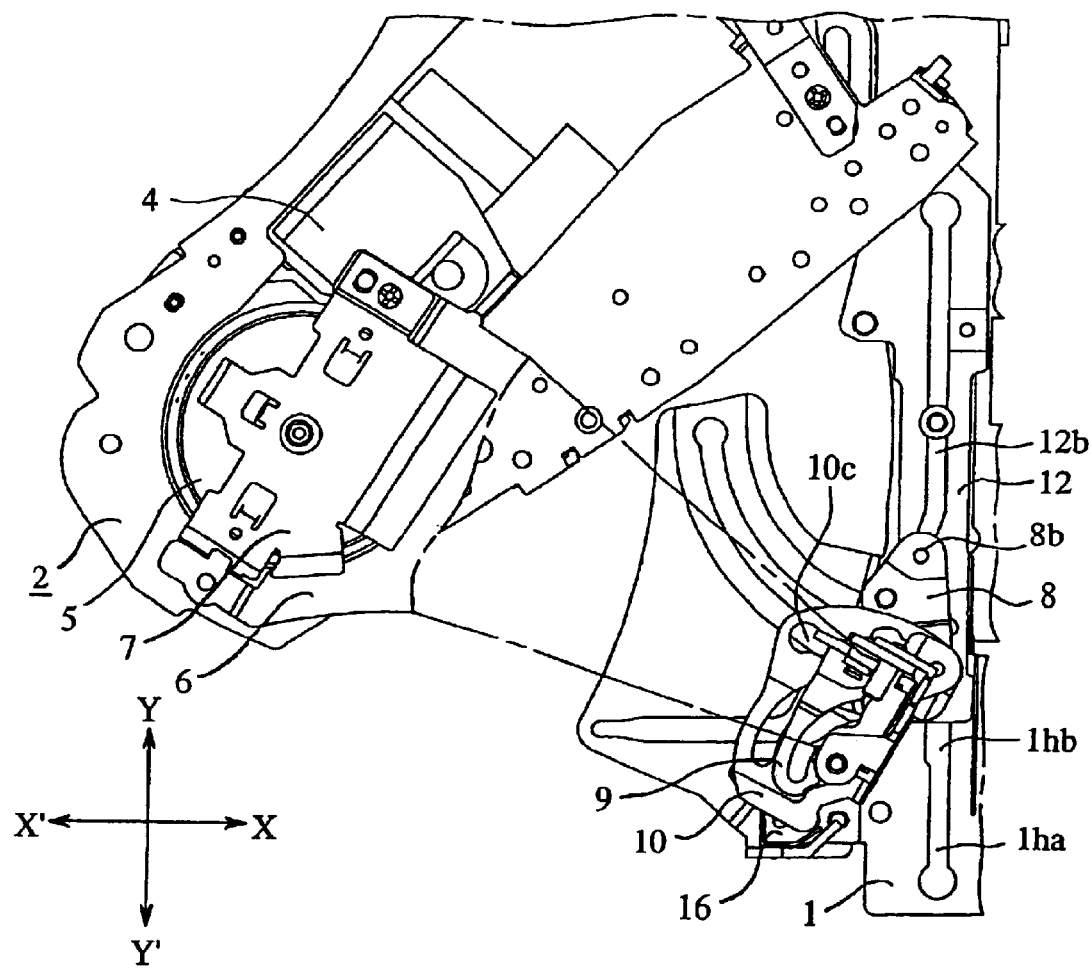
FIG. 9 is a plan view of relevant part to show a reproducing position after they chuck a disk together.
Figure 10:
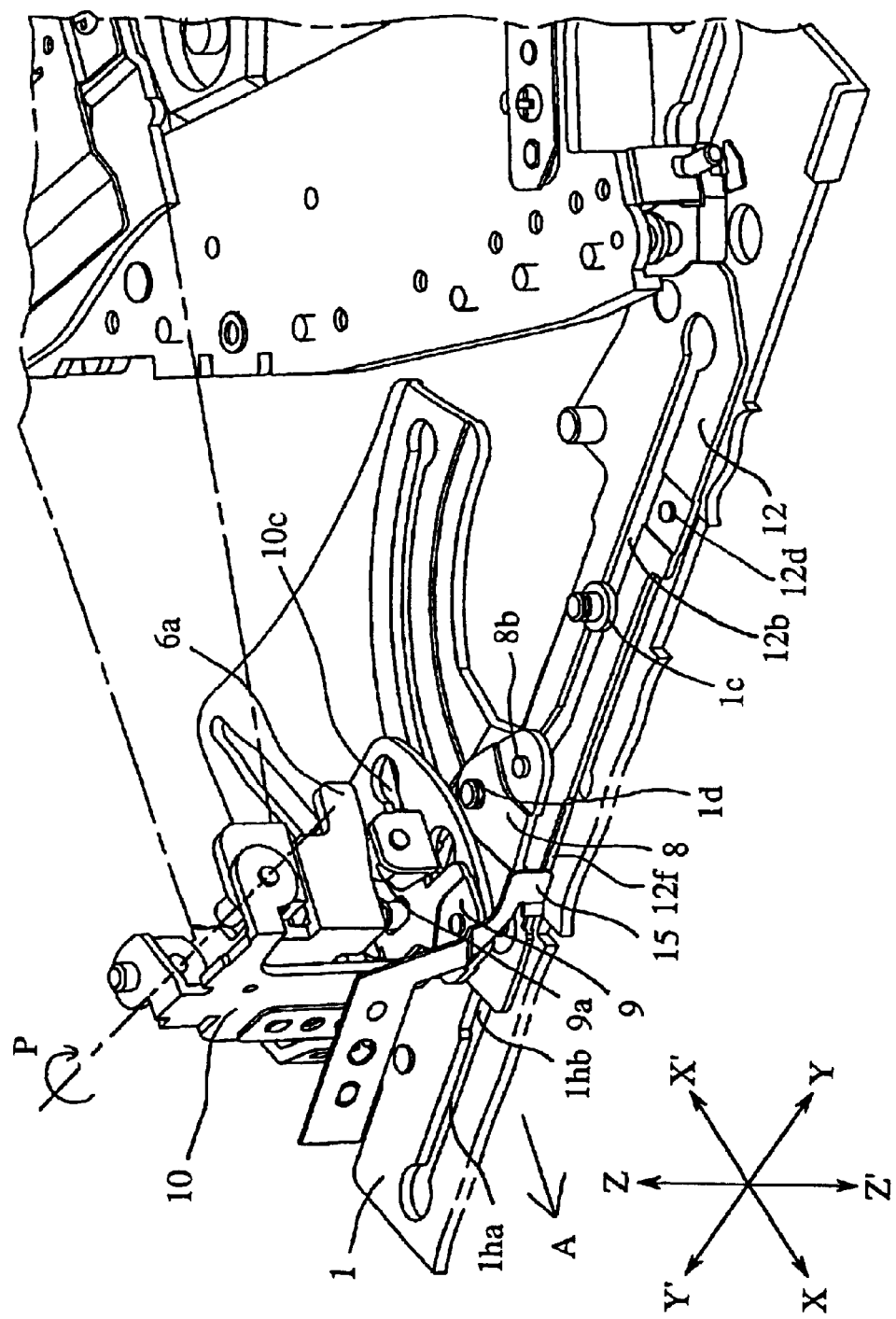
FIG. 10 is a perspective view of relevant part to show the reproducing position after they chuck a disk together.

Herein FIG. 5 and FIG. 6 show a waiting position of the clamper arm 6, FIG. 7 and FIG. 8 show a position where the turn table 3 and the clamper 5 are positioned on a same axis before they chuck a disk together, and FIG. 9 and FIG. 10 show a reproducing position after they chuck a disk together.

Hereinafter operation of the disk device will be explained.

Because the sliding pins 12d and 12e which are set at the back surface of movement regulating member 12, engage with the sliding holes 1g and 1h which are made on the base 1, the movement regulating member 12 is driven in a translational movement along Y direction of the drawing by a driving source which is not shown in the drawing.

Based on this movement, the pin 17a on sub base 17 which engages with the cam hole 12b on movement regulating member 12, is driven by a horizontal portion of the L shaped cam hole 12b, then the clamper base 10 swings around the supporting axis 1b of base 1. In other words, the clamper arm 6, clamper holder 7 and clamper 5 which are supported by the axes on the clamper base 10, and clamper plate 9 which engages with the bottom surface portion of clamper base 10 are driven to swing around the supporting axis 1b.

According as the movement regulating member 12 is driven along Y direction, the clamper base 10 also continues to swing around the supporting axis 1b, and when the clamper base 10 has swung a predetermined swinging angle, the abutting portion 10d on the clamper base 10 abuts with the positioning member 16 which is fixed on the base 1 and the swing movement is stopped.

At this point the pin 17a on the sub base 17 is shifted from the horizontal portion of L shaped cam hole 12a on the movement regulating member 12 to the vertical portion.

When the clamper base 10 abuts with the positioning member 16, a convex portion 12f of the movement regulating member 12 also abuts with the energizing spring 15 thereby the movement regulating member 12 receives an urging force by the spring in X' direction. At this point the sliding pin 12d is not driven along X' direction with the urging force by the spring because the sliding pin 12d on the movement regulating member 12 engages with the sliding hole 1g on the base 1.

On the other hand, because the sliding pin 12e arrives from a narrow portion 1ha of the sliding hole 1h at a widened portion 1hb, the sliding pin 12e becomes enable to swing in a direction B of the drawing with the pin 12d as an axis of swing. At the same time the pin 17a on the sub base 17 which engages with the L shaped cam hole 12a, becomes to receive an urging force from the cam hole 12a along X' direction because the movement regulating member 12 swings along B direction around the pin 12d as a center. At this point the clamper base 10 receives an urging force along a direction designated by a reference symbol C in FIG. 7 around the supporting axis 1b on the base 1 as a center, it causes an urging force along a direction for the positioning member 16 and the abutting portion 10d on the clamper base 10 to be abutted with each other (See FIG. 7 and FIG. 8).

As a result a predetermined strength of urging force is continued to apply to the clamper base 10 regardless of a distance which the movement regulating member is driven in translational movement because the urging force from the energizing spring 15 is applied in substantially perpendicular to the direction in which the movement regulating member is driven as the translational movement. Also a strong driving force is not required to drive the movement regulating member 12 because the urging force is not applied as a load to the translational movement of the movement regulating member 12. Moreover, the predetermined strength of urging force can be kept to apply even when an intentional load is abruptly applied to the movement regulating member 12 by a mechanical shock and the like from outside.

Further, when the movement regulating member 12 continues to be driven along Y direction, the pin 8b on the clamper driving member 8 which engages with the cam hole 12b, is driven by an inclined surface of the cam hole 12b to swing around the supporting axis 1d of base 1.

Accompanied with this movement, the clamper plate 9 which is slidably arranged on the bottom surface portion of clamper base 10, moves in translational movement along the cam hole 10c in a direction designated A in FIG. 7.

Because the roller 9a on clamper plate 9 abuts with the cam shape 6a of clamper arm 6 by an urging force of the clamper spring 11, the clamper arm 6 is made to swing around the axis 10a along P direction as contacting with the cam shape 6a according to the translational movement of clamper plate 9 to hold a disk which is not shown together with the turn table 3 and the clamper 5.

Further the movement regulating member 12 is continued to drive in translational movement along Y direction, then the urging force from the driving source is released at a predetermined position to stop the movement regulating member 12 (See FIG. 9 and FIG. 10). At this point because the energizing spring 15 and the convex portion 12f of movement regulating member 12 continue to contact with each other, the above described urging force from the energizing spring 15 is made to continuously apply on the clamper base 10 without variation.

Embodiment 2

The above described Embodiment 1 is explained about a disk device in which the energizing spring 15 is fixed on the base 1, however, it is also recommendable that the energizing spring 15 is fixed on the movement regulating member 12, this disk device also achieves quite the same effect as the above describe Embodiment 1.

Industrial Applicability

As set forth above, the disk device in accordance with the present invention is suitable for the disk device in which a plurality of disks are stored and it is required the disk is surely exchanged when an arbitrary disk is selected and reproduced.

What is claimed is:

1. A disk device comprising:
   a movement regulating member which is engaged with a sliding hole made on a base to slide on said base;
   a clamper base which is engaged with a cam hole made on said movement regulating member to swing around a swinging axis on said base as a center;
   a clamper arm which is supported on said clamper base to hold a clamper for clamper a disk;
   a positioning member which is arranged on said base to abut with the clamper base when said clamper base swings; and
   an energizing member which urges the movement regulating member along a direction substantially perpendicular to a sliding direction of said movement regulating member.

2. The disk device according to claim 1 characterized by that a widened portion is arranged in said sliding hole made on the base.

3. The disk device according to claim 1 characterized by that a convex portion which abuts with the energizing member, is arranged on the base.

4. The disk device according to claim 1 characterized by that said energizing member is fixed on the base.

5. The disk device according to claim 1 characterized by that said energizing member is arranged on the movement regulating member.

6. The disk device according to claim 1 characterized by that said energizing member is composed by a use of spring.

* * * * *